United States Patent
Hayward et al.

(10) Patent No.: US 9,188,499 B2
(45) Date of Patent: Nov. 17, 2015

(54) SUBSEA RETRIEVABLE PRESSURE SENSOR

(75) Inventors: Peter Hayward, Hebden Bridge (GB); Keith Mottram, Yeadon (GB); Chris Donnelly, Wakefield (GB); Stefan Maass, Ronnenberg (DE)

(73) Assignee: OneSubsea IP UK Limited, London (GB)

( * ) Notice: Subject to any disclaimer, the term of this patent is extended or adjusted under 35 U.S.C. 154(b) by 0 days.

(21) Appl. No.: 13/643,793

(22) PCT Filed: Oct. 4, 2011

(86) PCT No.: PCT/EP2011/004947
§ 371 (c)(1),
(2), (4) Date: Oct. 26, 2012

(87) PCT Pub. No.: WO2013/050051
PCT Pub. Date: Apr. 11, 2013

(65) Prior Publication Data
US 2014/0216165 A1    Aug. 7, 2014

(51) Int. Cl.
| | |
|---|---|
| *G01L 9/00* | (2006.01) |
| *G01L 19/00* | (2006.01) |
| *E21B 33/035* | (2006.01) |
| *E21B 47/00* | (2012.01) |
| *E21B 47/01* | (2012.01) |
| *E21B 47/06* | (2012.01) |

(52) U.S. Cl.
CPC ........... *G01L 19/0061* (2013.01); *E21B 33/035* (2013.01); *E21B 47/0001* (2013.01); *E21B 47/011* (2013.01); *E21B 47/06* (2013.01)

(58) Field of Classification Search
None
See application file for complete search history.

(56) References Cited

U.S. PATENT DOCUMENTS

| | | | |
|---|---|---|---|
| 3,701,549 A | 10/1972 | Koomey et al. | |
| 4,489,959 A | 12/1984 | Satterwhite | |
| 4,777,800 A * | 10/1988 | Hay, II | 60/593 |
| 6,588,985 B1 * | 7/2003 | Bernard | 405/191 |
| 6,644,410 B1 | 11/2003 | Lindsey-Curran et al. | |
| 8,011,434 B2 * | 9/2011 | Cosgrove et al. | 166/341 |

(Continued)

FOREIGN PATENT DOCUMENTS

GB    2358204 A * 7/2001

OTHER PUBLICATIONS

International Application No. PCT/EP2011/004947 Search Report and Written Opinion dated Jul. 6, 2012.

*Primary Examiner* — Peter Macchiarolo
*Assistant Examiner* — Jermaine Jenkins
(74) *Attorney, Agent, or Firm* — Conley Rose, P.C.

(57) ABSTRACT

A subsea retrievable pressure sensor for measuring fluid pressure at a well or other subsea fluid system. In one embodiment, a pressure sensor assembly includes a subsea pressure housing, a first pressure sensor, an electrical connector, a first hydraulic connector, and a latching mechanism. The first pressure sensor is disposed within the housing, and the electrical connector and first hydraulic connector are disposed in wall of the housing. The electrical connector is electrically coupled to the first pressure sensor to communicate electrical power though the housing to the first pressure sensor and to communicate pressure measurement values from the first pressure sensor through the housing. The first hydraulic connector is hydraulically coupled to the first pressure sensor to communicate hydraulic pressure to the first pressure sensor through the housing. The latching mechanism extends through the housing to secure the housing to a subsea receptacle.

21 Claims, 6 Drawing Sheets

(56) References Cited

U.S. PATENT DOCUMENTS

| | | |
|---|---|---|
| 8,464,797 B2 * | 6/2013 | Singh et al. .................. 166/340 |
| 2009/0038805 A1 | 2/2009 | Parks et al. |
| 2010/0206389 A1 * | 8/2010 | Kennedy et al. ............... 137/14 |
| 2012/0046870 A1 * | 2/2012 | Lievois et al. ................. 702/12 |
| 2013/0220625 A1 * | 8/2013 | Billington et al. ............ 166/336 |
| 2013/0283917 A1 * | 10/2013 | Coonrod et al. ................ 73/597 |
| 2013/0283919 A1 * | 10/2013 | Coonrod et al. ................ 73/632 |
| 2013/0333894 A1 * | 12/2013 | Geiger et al. ................ 166/336 |
| 2014/0076547 A1 * | 3/2014 | Unalmis et al. .......... 166/250.01 |

\* cited by examiner

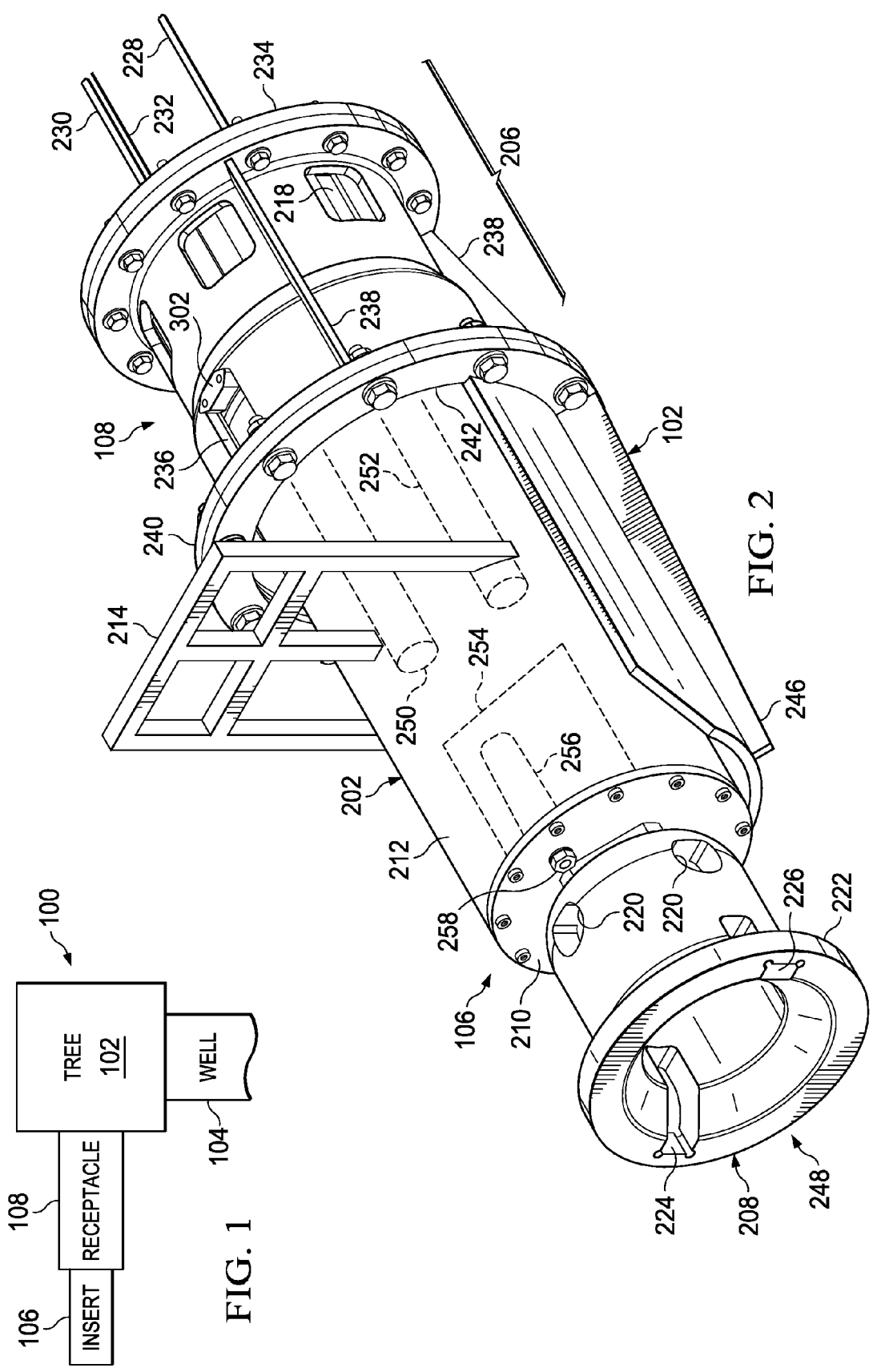

SUBSEA RETRIEVABLE PRESSURE SENSOR

This application is a U.S. National Stage application under 35 U.S.C. §371 of International Patent Application No. PCT/EP2011/004947 filed Oct. 4, 2011, entitled "Subsea Retrievable Pressure Sensor".

STATEMENT REGARDING FEDERALLY SPONSORED RESEARCH OR DEVELOPMENT

Not applicable.

BACKGROUND

Hydrocarbon fluids, such as oil or natural gas, are recovered from subsurface formations through wells drilled into the formations from the surface. A substantial amount of the hydrocarbon fluids may remain trapped in the formations if produced only using primary depletion (natural pressure depletion). When natural pressure is insufficient to adequately produce the trapped fluids, secondary recovery operations may be employed. In such operations, a fluid, known as a flooding liquid, is forced into the formation through an injection well. As the flooding liquid moves into the formation, the hydrocarbons are displaced and produced through production wells. Various fluids, such as water, air, carbon dioxide, etc. may be used as flooding fluids. When applied subsea, secondary recovery operations often employ seawater as the flooding liquid.

A flooding liquid is injected into formations under relatively high pressure. The characteristics of the formations determine the injection pressure. In general, the injection pressure should be high enough to displace the trapped hydrocarbons, and low enough to prevent fracturing of the formations. Consequently, the pressure of the flooding liquid should be carefully monitored.

SUMMARY

A subsea retrievable pressure sensor for measuring fluid pressure at a well or other subsea fluid system. In one embodiment, a pressure sensor assembly includes a subsea pressure housing, a first pressure sensor, an electrical connector, a first hydraulic connector, and a rotary latching mechanism. The first pressure sensor is disposed within the housing, and the electrical connector and first hydraulic connector are disposed in wall of the housing. The electrical connector is electrically coupled to the first pressure sensor to communicate electrical power though the housing to the first pressure sensor and to communicate pressure measurement values from the first pressure sensor through the housing. The first hydraulic connector is hydraulically coupled to the first pressure sensor to communicate hydraulic pressure to the first pressure sensor through the housing. The latching mechanism extends through the housing to secure the housing to a subsea receptacle.

In another embodiment, a subsea well includes a wellhead and a subsea tree coupled to the wellhead. The subsea tree includes a receptacle and a subsea replaceable pressure sensor insert. The receptacle includes electrical contacts and a first hydraulic coupler. The subsea replaceable pressure sensor insert is configured to measure a fluid pressure within the subsea tree. The pressure sensor insert is removably connected to the subsea tree via the receptacle.

In a further embodiment, a subsea retrievable pressure sensor insert includes a plurality of pressure sensors, a liquid filled cylindrical housing, an electrical connector, and a hydraulic connector. Each of the pressure sensors includes a protective case. The housing is disposed about the pressure sensors. The electrical connector and hydraulic connector are disposed in a wall of the housing to connect the pressure sensors to electrical power and hydraulic pressure provided by a subsea tree. The pressure sensors measure the hydraulic pressure and provide pressure measurement values to the subsea tree via the electrical connector.

BRIEF DESCRIPTION OF THE DRAWINGS

For a detailed description of exemplary embodiments of the invention, reference will now be made to the accompanying drawings in which:

FIG. 1 shows a schematic diagram of a subsea tree including a retrievable pressure sensor insert in accordance with various embodiments;

FIG. 2 shows a perspective view of the retrievable pressure sensor insert installed in the subsea tree in accordance with various embodiments;

NOTATION AND NOMENCLATURE

Figure 3:
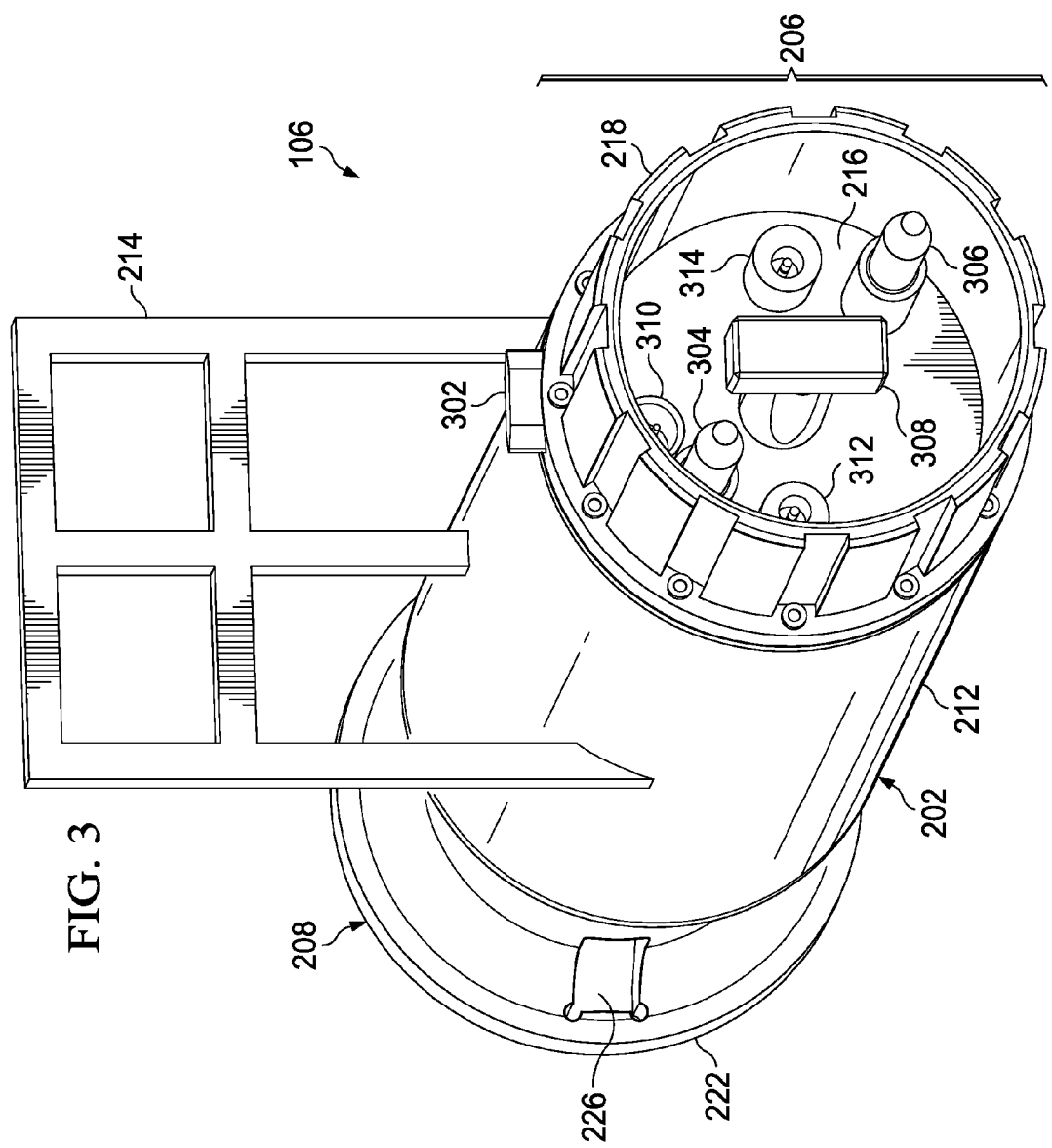
FIG. 3 shows a view of the connection end of the retrievable pressure sensor insert in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The pressure of well fluids, including fluids such as water injected into subsurface formations must be carefully monitored. To facilitate pressure monitoring, a subsea tree disposed at a well includes a pressure sensor to measure the injection fluid pressure. The subsea reservoir including the subsea tree may have a life of forty years or more. Unfortunately, pressure sensors installed at the subsea tree may have a substantially shorter life than the reservoir. For example, a pressure sensor may have an operational life of twenty years or less. Embodiments of the present disclosure include a retrievable pressure sensor insert that can be retrieved from and installed in a subsea tree by a remotely operated vehicle (ROV) including only standard ROV tools. For example, the retrievable pressure sensor insert may be installed by light or heavy workclass ROV including a torque tool and a manipulator.

FIG. 1 shows a schematic diagram of a subsea system 100 including a subsea tree 102. The subsea tree 102 includes a retrievable pressure sensor insert 106 in accordance with various embodiments. The subsea tree 102 is coupled to a well 104 and may include a variety of valves, fittings, and controls for operating the well 104. The subsea tree 102, known in the art as a Christmas tree, also includes a receptacle 108. The retrievable pressure sensor insert 106 connects to the subsea tree 102 via the receptacle 108. The subsea system 100 may be configured to extract hydrocarbons (e.g., oil and/or natural gas) from the well 104 or to inject fluids into the well 104. The retrievable pressure sensor insert 106 includes one or more pressure sensing elements that measure the pressure of a fluid in the well 104. In some embodiments, the one or more pressure sensing elements of the retrievable pressure sensor insert 106 measure the pressure of a fluid, such as water, injected into the well 104 by the subsea tree 102.

In other embodiments of the subsea system 100, the receptacle 108 and the retrievable pressure sensor insert 106 are coupled to a subsea fluid system or structure other than a subsea tree. Thus, in various embodiments of the system 100, the tree 102 may represent a pipeline end termination, a pipeline end manifold, a manifold, or another subsea fluid system or structure to which the retrievable pressure sensor insert 106 is coupled for measuring fluid pressure.

FIG. 2 shows a perspective view of the retrievable pressure sensor insert 106 installed in the subsea tree 102 in accordance with various embodiments. The retrievable pressure sensor insert 106 includes a housing 202, a plurality of pressure sensing elements 250, 252, a tree interface 206, and an ROV interface 208. The housing 202 includes an outer-end plate 210, a side wall 212, a handle 214, an inner-end plate 216 (FIG. 3), and a tree-interface shield 218. The side wall 212 and end plates 210 and 216 may be made from a generally rigid, corrosion-resistant material and may generally define a right cylindrical volume with a circular base. The tree-interface shield 218 may extend from the side wall 212 beyond the inner-end plate 216. The handle 214 may be affixed (for example, welded) to the side wall 212 and may have a shape suitable to allow an ROV to manipulate the retrievable pressure sensor insert 106. The housing 202 encloses and protects the pressure sensing elements 250, 252 and associated wiring, and the insert receptacle 108 protects the sensor insert 106.

As illustrated by FIG. 3, the tree interface 206 may include a key 302, guide pins 304 and 306, a latch 308, an electrical connector 310, and fluid-connectors 312 and 314. In some embodiments, with the exception of the key 302, the components of the tree interface 206 may be generally disposed within the tree-interface shield 218. These components may be configured to electrically, fluidly, and/or mechanically couple the retrievable pressure sensor insert 106 to the tree 102 via complementary components on the receptacle 108.

Figure 5:
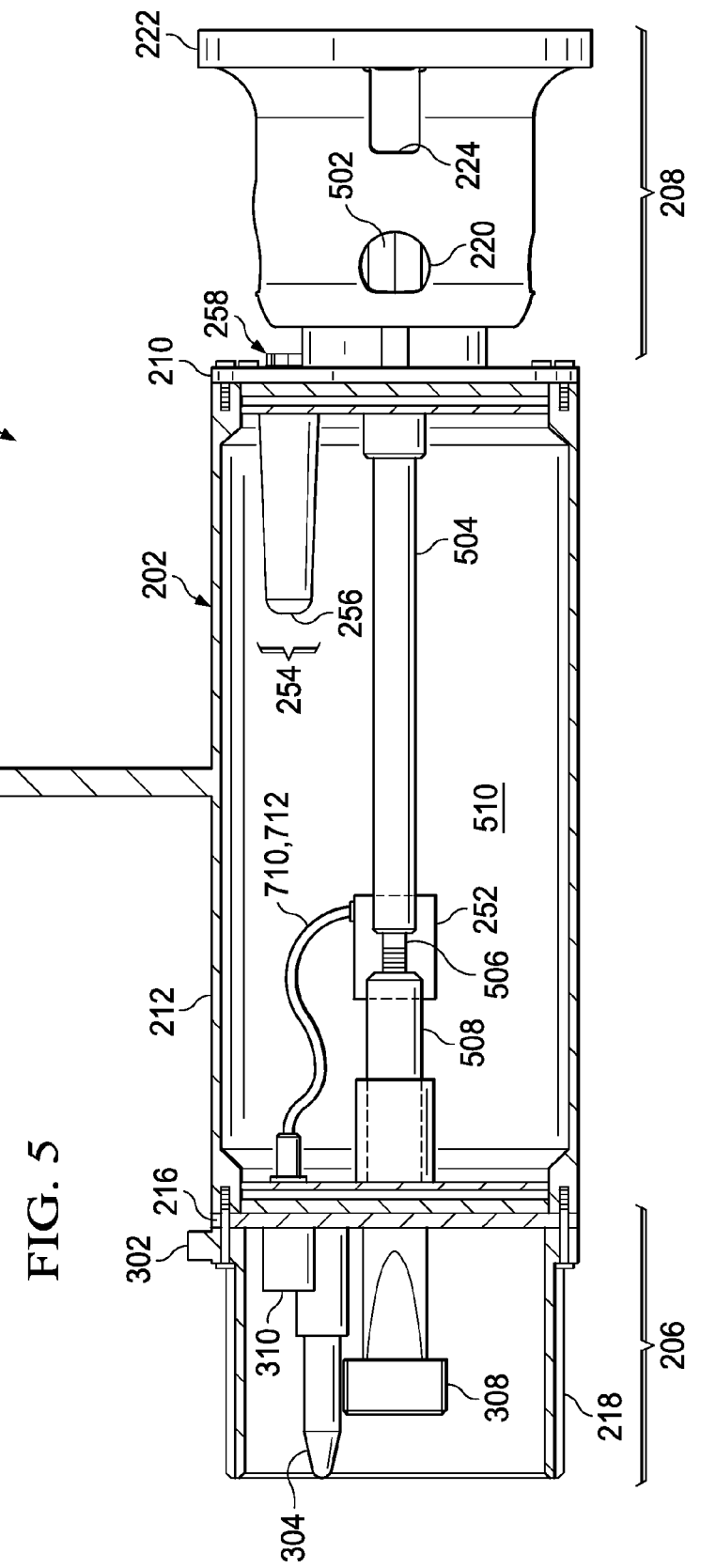
FIG. 5 shows a cross-sectional view of the retrievable pressure sensor insert in accordance with various embodiments.

The ROV interface 208 is shown in FIGS. 2 and 5. The ROV interface 208 includes apertures 220, a flared grip 222, slots 224 and 226, and a torque-tool interface 502. In some embodiments, the ROV interface 208 may be an API 170 class 4 ROV interface. The ROV interface 208 may be attached to the outer end plate 210. The torque-tool interface 502, which may be configured to couple to a torque tool on an ROV, may be disposed within the flared grip 222 and generally symmetrically between the slots 224 and 226.

As shown in FIG. 5, the torque-tool interface 502 may be coupled to an internal drive mechanism that includes a driveshaft 504, a threaded coupling 506, and a cam 508 that is linked to the latch 308.

Figure 4:
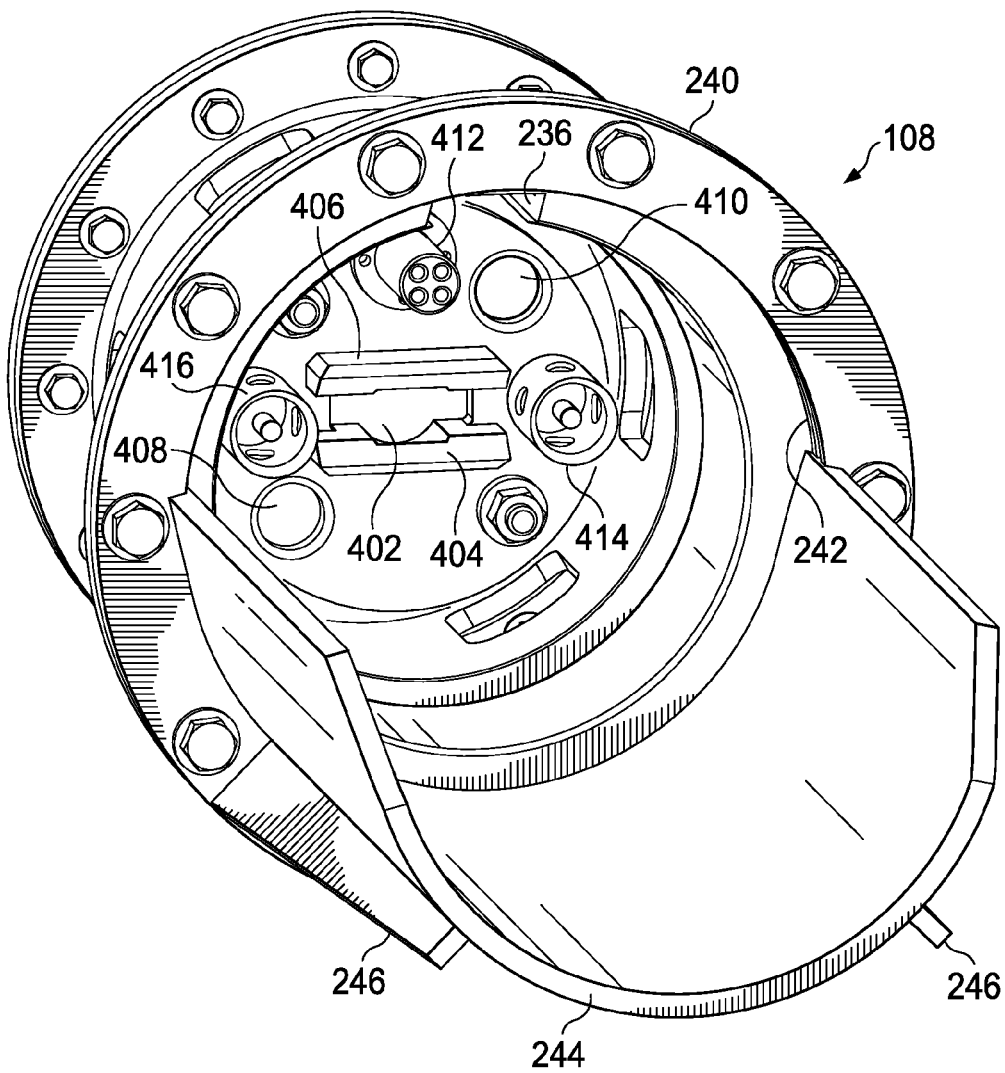
FIG. 4 shows a view of the connection end of the receptacle for connecting the retrievable pressure sensor insert to the subsea tree in accordance with various embodiments.

FIGS. 2 and 4 show the insert receptacle 108. The insert receptacle 108 includes fluid lines 228 and 230, an electrical connection 232, a mounting flange 234, a keyway 236, support flanges 238, an outer flange 240, a insert aperture 242, a insert tray 244, and tray supports 246. The fluid lines 228, 230 are fluid conduits, tubes, pipes, etc. that are in fluid communication with fluid whose pressure is to be measured and reported by the retrievable pressure sensor insert 106. The electrical connection 232 couples to a power source, a controller, a data recorder, a data transmitter, etc. disposed in the tree 102. The mounting flange 234 may be configured to couple the insert receptacle 108 to the tree 102. The keyway 236 and the insert tray 244 may be configured to at least roughly align the retrievable pressure sensor insert 106 to the insert receptacle 108 during installation of the retrievable pressure sensor insert 106. More specifically, the insert tray 244 may be configured to support the retrievable pressure sensor insert 106 as it slides into the insert aperture 242, and the key 302 may be configured to slide into the keyway 236 to rotationally position the retrievable pressure sensor insert 106.

As shown in FIG. 4, the insert receptacle 108 may include a slot 402, lead-in chamfers 404 and 406, chamfered apertures 408 and 410, a complementary electrical connector 412, and complementary fluid connectors 414 and 416. In some embodiments, these components may be disposed within the insert aperture 242. The lead-in chamfers 404 and 406 and the slot 402 may be configured to align and receive the latch 308 from the retrievable pressure sensor insert 106, and the chamfered apertures 408 and 410 may be configured to receive the guide pins 304 and 306, respectively. The complementary fluid connectors 414 and 416 may be configured to fluidly couple the fluid lines 228 and 230 to the fluid connectors 312 and 314 of the retrievable pressure sensor insert 106. Fluid connectors 312, 314 and the complementary fluid connectors 414, 416 may include valves (e.g., poppets) that permit fluid flow (i.e., transfer of fluid pressure) only while the retrievable pressure sensor insert 106 is connected to the receptacle 108. The complementary electrical connector 412 may be configured to electrically couple the electrical connector 310 of the retrievable pressure sensor insert 106 to the electrical connection 232

During installation, the retrievable pressure sensor insert 106 may be secured to an ROV above or near the surface of the ocean, e.g., on a support structure or vessel. The ROV may include a torque tool for manipulation of the torque-tool interface 502, and an open-close manipulator for holding the handle 214. ROVs employing such tools are commonly used for servicing subsea structures, such as the tree 102. Consequently, the retrievable pressure sensor insert 106 can be installed on and/or retrieved from the subsea tree 102 by a commonly used ROV with no requirement for specialized tooling or equipment.

Figure 8:
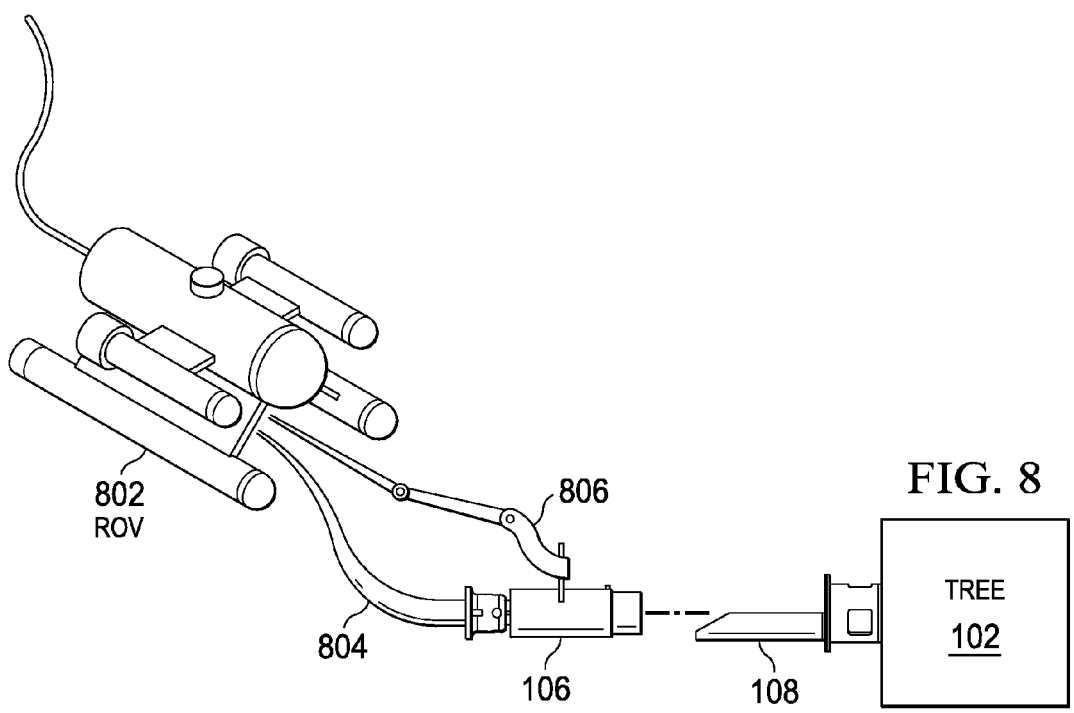
FIG. 8 shows the retrievable pressure sensor insert manipulated by a remotely operated vehicle in accordance with various embodiments.

After the retrievable pressure sensor insert 106 is attached to the ROV, the ROV may submerge, convey the retrievable pressure sensor insert 106 to the tree 102, and place the insert 106 on the insert tray 244. FIG. 8 shows the ROV 802 transporting the retrievable pressure sensor insert 106 for installation at the subsea tree 102 or after removal from the subsea tree 102. The ROV 802 includes a torque tool 804 and a manipulator tool 806. To install the insert 106 in the receptacle 108, the ROV 802 may rotate the retrievable pressure sensor insert 106 to align the key 302 with the keyway 236 of the receptacle 108. The ROV 802 may then drive the retrievable pressure sensor insert 106 forward into the insert aperture 242, as indicated by arrow 248 in FIG. 2. As the retrievable pressure sensor insert 106 moves forward, the guide pins 304 and 306 may mate or cooperate with the chamfered apertures 408 and 410 to further refine the alignment of the retrievable pressure sensor insert 106. With further forward movement, the latch 308 may be inserted through the slot 402 with the aid of the lead in chamfers 404 and 406.

To form the electrical and fluid connections, the torque tool 804 on the ROV 802 may then rotate the torque-tool interface 502, which in turn rotates the driveshaft 504 within the cam 508. The cam 508 may transmit approximately the first 90° of rotation of the driveshaft 504 into rotation of the latch 308, thereby positioning the latch 308 out of alignment with the slot 402 and generally preventing the latch 308 from being pulled back through the slot 402. After 90° of rotation, the cam 508 may generally cease transmitting rotation of the driveshaft 504, and the threaded coupling 506 may convert rotation of the driveshaft 504 into a linear translation or pulling of the latch 308 back towards the housing 202. However, because the latch 308 is out of alignment with the slot 402, it may be generally prevented from moving backwards by the insert receptacle 108. As the latch 308 is pulled backwards, the retrievable pressure sensor insert 106 may gradually translate forward, causing the electrical and fluid connectors (310, 312, 314) of the retrievable pressure sensor insert 106 to engage the corresponding connectors (412, 414, 416) of the receptacle 108, thereby forming the electrical and fluid connections. Finally, the ROV 802 may disengage from the retrievable pressure sensor insert 106 and return to the surface.

Removal of the retrievable pressure sensor insert 106 from the receptacle 108 is performed by the ROV 802 by a sequence of operations generally reversed from those discussed above. The ROV 802 attaches to the insert 106, and providing driveshaft rotation in the direction opposite from that used to install the insert 106. The reverse rotation releases the latch 302 allowing the ROV 802 to extract the retrievable pressure sensor insert 106 without affecting operation of the well 104.

The interior of the housing 202 may be partially or substantially entirely filled with a protective fluid 510, such as oil. In some embodiments, the protective fluid 510 may be hydraulic gear oil. Advantageously, the protective fluid 510 may lubricate and/or tend to reduce wear on components inside the housing 202, such as the driveshaft 504, the cam 508, and the threaded coupling 506. To maintain separation of seawater and the protective fluid 510, the housing 202 may be sealed and substantially watertight. In some sub-sea applications, a difference in pressure between the protective fluid 510 and surrounding seawater may exert a hydrostatic load on the housing 202.

Figure 6:
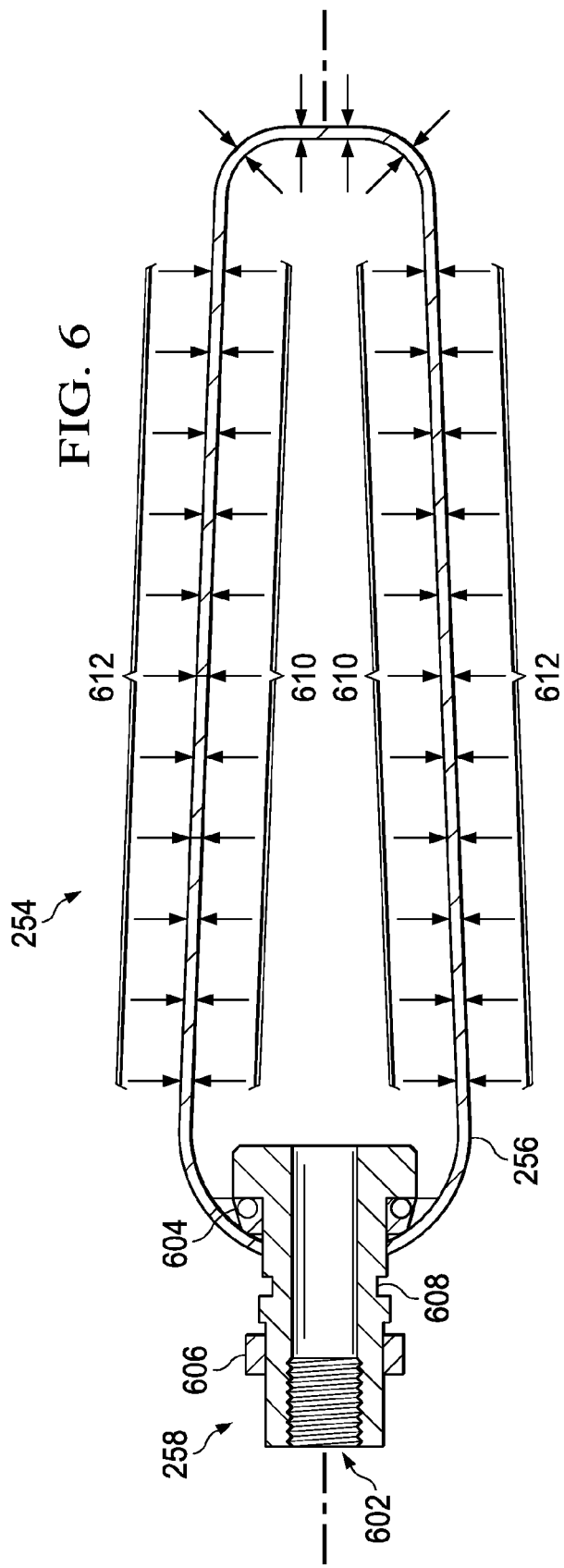
FIG. 6 shows a cross-sectional view of a pressure equalizer in accordance with various embodiments.

To reduce the pressure differential between the protective fluid 510 and the seawater surrounding the housing 202, the retrievable pressure sensor insert 106 may include a pressure equalizer 254. FIG. 6 shows a cross-sectional view of the pressure equalizer 254 in accordance with various embodiments. The pressure equalizer 254 includes at least one bladder 256 and fitting 258. The bladder 256 may extend inward into the housing 202 from the outer-end plate 210. The bladder 256 may be made of a resilient and/or watertight material, such as rubber, neoprene, vinyl, or silicone. The bladder 256 may have a generally cylindrical shape and couple to the fitting 258 at one end.

The fitting 258 may include a water inlet 602, sealing members 604 and 606, and an O-ring seat 608. The water inlet 602 may extend through the fitting 258 and provide a fluid passage into the bladder 256. The sealing member 604 may seal the bladder 256 to the fitting 258. The sealing member 606 and the O-ring seat 608 (fitted with an O-ring (not shown)) may cooperate with an aperture in the outer-end plate 210 to secure the fitting 258 to the outer-end plate 210 and form a generally watertight seal with the outer-end plate 210. In some embodiments, the fitting 258 may include threads that cooperate with complementary threads on the outer-end plate 210 and/or a threaded nut disposed outside of the outer-end plate 210.

In operation, the pressure equalizer 254 may tend to reduce a difference in pressure between the protective fluid 510 and surrounding water pressure. The forces from surrounding water pressure on the bladder 256 are depicted by arrows 610 in FIG. 6, and the forces from the pressure of the protective fluid 510 are illustrated by arrows 612. If the water pressure 610 is greater than the pressure of the protective fluid 612, the bladder 256 may expand and/or apply a force to the protective fluid 510 and increase the pressure 612 of the protective fluid 510, thereby potentially reducing the pressure differential. In some embodiments, the protective fluid 510 may be substantially incompressible and the bladder 256 may primarily transmit a force rather than expand to equalize pressure.

Some embodiments may include other types of pressure equalizers 254, such as a piston disposed within a cylinder that is in fluid communication with the protective fluid 510 and surrounding seawater on respective opposite sides of the piston. In another example, the pressure equalizer 254 may include a resilient or less rigid portion of the housing 202 that is configured to transmit a force to the protective fluid 510.

Figure 7:
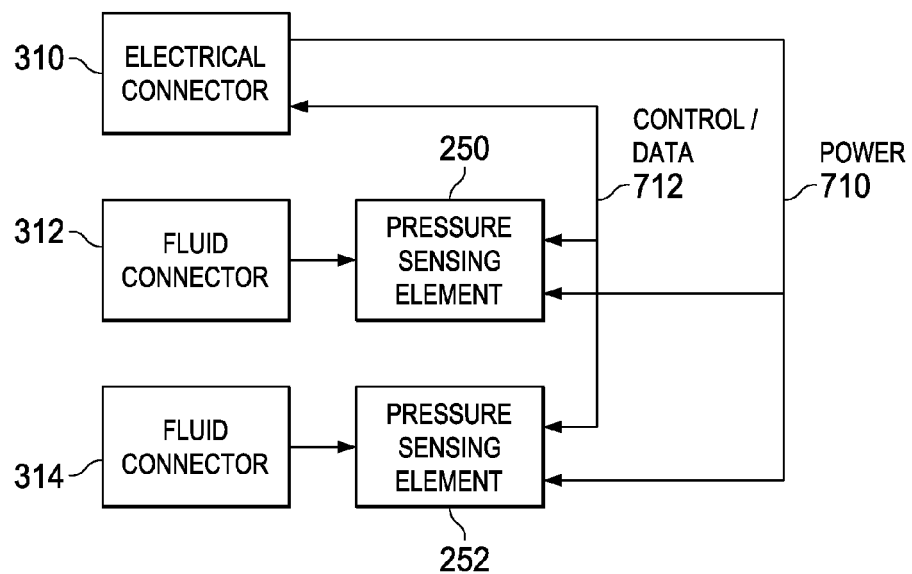
FIG. 7 shows a block diagram of the retrievable pressure sensor insert in accordance with various embodiments.

FIG. 7 shows a block diagram of the retrievable pressure sensor insert 106 in accordance with various embodiments. The fluid connector 312 is hydraulically coupled to the pressure sensing element 250 and the fluid connector 314 is hydraulically coupled to the pressure sensing element 252. Hydraulic pressure is transferred from the subsea tree 102 to the pressure sensing elements 250 and 252 via the fluid connectors 312, 314. The pressure sensing elements 250 and 252 are distinct and separately packaged devices. Each of the pressure sensing elements 250 and 252 includes a case that protects the components of the sensing element. Thus, the pressure sensing element 250 and components fluidically coupling pressure sensing element 250 to the fluid pressure of the subsea fluid system 102 (e.g., fluid-connectors 314, 416) are completely separate from the pressure sensing element 250 and associated components. Failure of one sensing element 250, 252 and/or failure of a corresponding case or associated component has no effect on the other element 250, 252 or its operation. Thus, the retrievable pressure sensor insert 106 advantageously provides pressure sensing elements 250, 252 and pressure paths that are fully redundant and depend on no shared fluid related components.

The electrical connector 310 is electrically coupled to the pressure sensing elements 250 and 252. A conductor 710 (or conductors) carrying power extends between the electrical connector 310 and each of the pressure sensing elements 250 and 252. In some embodiments, different conductors 710 carry power from the electrical connector 310 to each pressure sensing element 250, 252. In other embodiments, the pressure sensing elements 250, 252 share one or more conductors 710 carrying power from the electrical connector 310. Control and data signals are also exchanged between the electrical connector 310 and the pressure sensing elements 250, 252 via electrical conductors 712. The data signals include measurements of fluid pressure generated by the pressure sensing elements 250, 252. Control signals may include pressure data acquisition timing controls and/or transmission controls, etc.

In some embodiments of the retrievable pressure sensor insert 106, the pressure sensing elements 250, 252 may include interfaces configured to operate in accordance with the controller area network (CAN) standard. In such embodiments, control and data signal transfers are executed as specified by the CAN standard.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A pressure sensor assembly, comprising:
a subsea pressure housing;
a first pressure sensor disposed within the housing;
an electrical connector disposed in a wall of the housing, the electrical connector electrically coupled to the first pressure sensor to communicate electrical power though the housing to the first pressure sensor and to communicate pressure measurement values from the first pressure sensor through the housing;
a first hydraulic connector disposed in the wall of the housing, the first hydraulic connector hydraulically coupled to the first pressure sensor to communicate hydraulic pressure of a fluid system to the first pressure sensor through the housing when the housing is installed at a corresponding receptacle of the fluid system; and
a latching mechanism extending through the housing to secure the housing to a subsea receptacle.

2. The pressure sensor assembly of claim 1, further comprising a second pressure sensor disposed within the housing, the second pressure sensor electrically coupled to the electrical connector to communicate electrical power and pressure measurement values.

3. The pressure sensor assembly of claim 2, further comprising a second hydraulic connector disposed in the wall of the housing, the second hydraulic connector hydraulically coupled to the second pressure sensor to communicate hydraulic pressure to the first pressure sensor through the housing.

4. The pressure sensor assembly of claim 2, wherein the second pressure sensor is hydraulically coupled to the first hydraulic connector.

5. The pressure sensor assembly of claim 2, wherein the first pressure sensor is disposed in a first protective case and the second pressure sensor is disposed in a second protective case, and wherein each pressure sensor is configured to operate in the presence of a failure of the protective case of the other pressure sensor.

6. The pressure sensor assembly of claim 1, wherein the housing includes handling features that configure the housing for manipulation by a remotely operated undersea vehicle.

7. The pressure sensor assembly of claim 1, wherein the housing is retrievable and operably installable in a receptacle of subsea tree by a remotely operated vehicle including a torque tool to operate the rotary latching mechanism and an open/close manipulator to grasp a handle of the housing.

8. A subsea fluid system, comprising:
a receptacle comprising electrical contacts and a first hydraulic coupler; and
a subsea replaceable pressure sensor insert configured to measure a fluid pressure within the subsea fluid system when the insert is installed at the receptacle;
wherein the pressure sensor insert is removably connected to the subsea fluid system via the receptacle.

9. The subsea fluid system of claim 8, wherein the pressure sensor insert is mechanically, electrically, and hydraulically coupled to the receptacle.

10. The subsea fluid system of claim 8, wherein the pressure sensor insert comprises a first pressure sensing element and a first hydraulic coupler for connecting the first pressure sensing element to the fluid pressure via the first hydraulic coupler of the receptacle.

11. The subsea fluid system of claim 10, wherein the pressure sensor insert comprises electrical contacts to electrically couple the pressure sensor insert to the subsea tree via the electrical contacts of the receptacle; and wherein the first pressure sensing element receives electrical power from the subsea tree and the first pressure sensing element provides measurements of the fluid pressure to the subsea tree.

12. The subsea fluid system of claim 10, wherein the pressure sensor insert comprises a second pressure sensing element and each of the first and second pressure sensing elements comprises a protective case.

13. The subsea fluid system of claim 12, wherein the receptacle comprises a second hydraulic coupler and the pressure sensor insert comprises a second hydraulic coupler, and the second pressure sensing element is configured to measure a fluid pressure within the fluid subsea fluid system.

14. The subsea fluid system of claim 13, wherein each hydraulic coupler of the receptacle includes a valve that enables fluid flow through the coupler from the subsea fluid system only while the pressure sensor insert is installed in the receptacle.

15. The subsea fluid system of claim 12, wherein the first pressure sensing element and the second pressure sensing element are hydraulically coupled to the subsea fluid system via the first hydraulic coupler of the receptacle.

16. The subsea fluid system of claim 8, wherein the pressure sensor insert includes a latching system and a handle for installing the pressure sensor insert in the receptacle by a remotely operated underwater vehicle.

17. The subsea fluid system of claim 16, wherein the pressure sensor insert is installable in the receptacle by a remotely operated underwater vehicle including only a torque tool and an open/close manipulator.

18. The subsea fluid system of claim 8, comprising at least one of a subsea tree, a pipeline end termination, a pipeline end manifold, and a manifold.

19. A subsea retrievable pressure sensor insert, comprising:
- a plurality of pressure sensors, each comprising a protective case;
- a liquid filled cylindrical housing disposed about the pressure sensors; and
- an electrical connector and a hydraulic connector disposed in a wall of the housing to connect the pressure sensors to electrical power and hydraulic pressure provided by a subsea tree;
- wherein the pressure sensors measure the hydraulic pressure and provide pressure measurement values to the subsea tree via the electrical connector.

20. The insert of claim 19, wherein the housing comprises:
- a latching mechanism configured to secure the insert in the receptacle;
- a handle configured to be gripped by a subsea remotely operated vehicle (ROV) comprising an open/close manipulator;
- wherein the latching mechanism is operable to secure the insert to the receptacle and release the insert from the receptacle via a torque tool operated by the ROV.

21. The insert of claim 19, wherein a failure of the protective case of a first one of the pressure sensors does not affect the operation of a second one of the pressure sensors.

* * * * *